(12) United States Patent
Stankevitz

(10) Patent No.: US 9,399,476 B1
(45) Date of Patent: Jul. 26, 2016

(54) CARRIAGE ASSEMBLY

(71) Applicant: Diane Stankevitz, West Covina, CA (US)

(72) Inventor: Diane Stankevitz, West Covina, CA (US)

( * ) Notice: Subject to any disclaimer, the term of this patent is extended or adjusted under 35 U.S.C. 154(b) by 0 days.

(21) Appl. No.: 14/592,889

(22) Filed: Jan. 8, 2015

(51) Int. Cl.
*B62B 3/02* (2006.01)
*B62B 5/00* (2006.01)

(52) U.S. Cl.
CPC ................................ *B62B 5/0003* (2013.01)

(58) Field of Classification Search
CPC .. B62B 5/0003; B62B 3/027; B62B 2206/06; A61G 1/0212; A61G 1/0237
See application file for complete search history.

(56) References Cited

U.S. PATENT DOCUMENTS

| | | | | |
|---|---|---|---|---|
| 1,370,732 A * | 3/1921 | Corbett | ................. | A47B 91/02 108/146 |
| 2,565,820 A * | 8/1951 | Machanic | ............. | B62B 5/0003 280/38 |
| 2,841,438 A * | 7/1958 | Weil | ...................... | B62B 5/0003 280/641 |
| 2,877,047 A * | 3/1959 | Weil | ..................... | A61G 1/0565 280/641 |
| 2,877,048 A * | 3/1959 | Weil | ..................... | A61G 1/0565 280/641 |
| 3,082,016 A * | 3/1963 | Pratt | ..................... | B62B 5/0003 280/641 |
| 3,223,429 A * | 12/1965 | Hastings | ............... | B62B 1/0002 224/401 |
| 3,493,262 A * | 2/1970 | Ferneau | ................ | B62B 5/0003 280/641 |
| 3,498,628 A * | 3/1970 | Ferneau | ............... | A61G 1/0565 280/641 |
| 4,192,541 A * | 3/1980 | Ferneau | ............... | A61G 1/0565 280/640 |
| 4,199,170 A * | 4/1980 | Hubner | ................. | B62B 5/0003 280/641 |
| 4,369,985 A * | 1/1983 | Bourgraf | .................. | B62B 3/02 280/43.1 |
| 4,682,810 A * | 7/1987 | Zarka | .................... | A61G 1/0562 280/640 |
| 4,921,295 A * | 5/1990 | Stollenwerk | ......... | A61G 1/0293 296/20 |
| 5,004,263 A * | 4/1991 | Hubbard | ............... | B62B 5/0003 280/47.18 |
| D360,513 S | 7/1995 | Thompson | | |
| 5,509,159 A * | 4/1996 | Du-Bois | ................ | A61G 1/013 296/20 |

(Continued)

*Primary Examiner* — Brodie Follman

(57) ABSTRACT

A carriage assembly includes a cart with a bottom wall and a peripheral wall. A top side of the cart is open. The peripheral wall has a front side, a back side, a first lateral side and a second lateral side. The cart may contain a plurality of objects. A handle is attached to the cart. A rolling apparatus is coupled to the cart to facilitate the cart is rolled along a support surface. The rolling apparatus is positionable in a deployed position to elevate the cart a maximum distance above the support surface. The rolling apparatus is positionable in a retracted position to lower the cart to a minimum distance above the support surface. A lock coupled to the cart and is in mechanical communication with the rolling apparatus. The lock releases the rolling apparatus to facilitate positioning the rolling apparatus between the deployed position and the retracted position.

7 Claims, 6 Drawing Sheets

(56) References Cited

U.S. PATENT DOCUMENTS

| | | | |
|---|---|---|---|
| D371,664 S | 7/1996 | Ponce et al. | |
| 5,649,718 A * | 7/1997 | Groglio | B60R 5/04 280/43.17 |
| 5,906,383 A * | 5/1999 | Cortes | B62B 3/027 280/47.371 |
| 6,024,527 A * | 2/2000 | Soriano | B60R 5/04 254/10 R |
| 6,045,150 A * | 4/2000 | Al-Toukhi | B62B 3/027 248/676 |
| 6,070,899 A * | 6/2000 | Gines | B62B 5/0003 280/43.1 |
| 6,575,491 B2 * | 6/2003 | Miller | B62B 3/027 280/43.17 |
| 6,976,696 B2 * | 12/2005 | O'Krangley | A61G 1/0562 280/638 |
| 7,080,844 B2 * | 7/2006 | Espejo | B62B 3/027 280/33.995 |
| 7,229,093 B1 * | 6/2007 | Carter | B62B 3/022 280/641 |
| 7,658,388 B1 * | 2/2010 | Rodriguez | B62B 3/027 108/131 |
| 7,703,776 B1 * | 4/2010 | Nugent | B62B 1/22 280/47.18 |
| 8,075,016 B2 * | 12/2011 | Silberberg | B62B 3/027 280/43 |
| 8,172,256 B2 * | 5/2012 | Fine | B62B 3/027 280/38 |
| 8,333,404 B2 * | 12/2012 | Moster | B62B 3/027 280/33.991 |
| 8,408,581 B1 * | 4/2013 | Hunter | B62B 3/027 280/33.993 |
| 8,540,273 B2 * | 9/2013 | Dobrachinski | B62B 3/027 280/47.34 |
| 9,126,610 B1 * | 9/2015 | Abiri | B62B 5/0003 |
| 9,167,892 B1 * | 10/2015 | Korb | A47B 3/0812 |
| 9,211,899 B2 * | 12/2015 | Beauchamp | B62B 5/0003 |
| 9,221,486 B2 * | 12/2015 | Fine | B62B 5/0003 |
| 2005/0140119 A1 * | 6/2005 | Wong | B62B 3/027 280/651 |
| 2008/0061531 A1 * | 3/2008 | Nugent | B62B 3/027 280/638 |
| 2008/0303248 A1 * | 12/2008 | Chaparro | B62B 3/027 280/651 |
| 2011/0208613 A1 * | 8/2011 | Parham | G06Q 30/0623 705/26.61 |
| 2012/0193894 A1 * | 8/2012 | Fine | B62B 3/027 280/651 |
| 2014/0140797 A1 * | 5/2014 | Howe | B62B 3/027 414/498 |

* cited by examiner

CARRIAGE ASSEMBLY

BACKGROUND OF THE DISCLOSURE

1. Field of the Disclosure

The disclosure relates to carriage devices and more particularly pertains to a new carriage device for allowing the carriage to be more easily placed within and removed from a vehicle.

2. Summary of the Disclosure

An embodiment of the disclosure meets the needs presented above by generally comprising a cart that has a bottom wall and a peripheral wall extending upwardly therefrom. A top side of the cart is open. The peripheral wall has a front side, a back side, a first lateral side and a second lateral side. The cart may contain a plurality of objects. A handle is attached to the cart. A rolling apparatus is coupled to the cart to facilitate the cart is rolled along a support surface. The rolling apparatus is positionable in a deployed position to elevate the cart a maximum distance above the support surface. The rolling apparatus is positionable in a retracted position to lower the cart to a minimum distance above the support surface. A lock is coupled to the cart and is in mechanical communication with the rolling apparatus. The lock releases the rolling apparatus to facilitate positioning the rolling apparatus between the deployed position and the retracted position.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
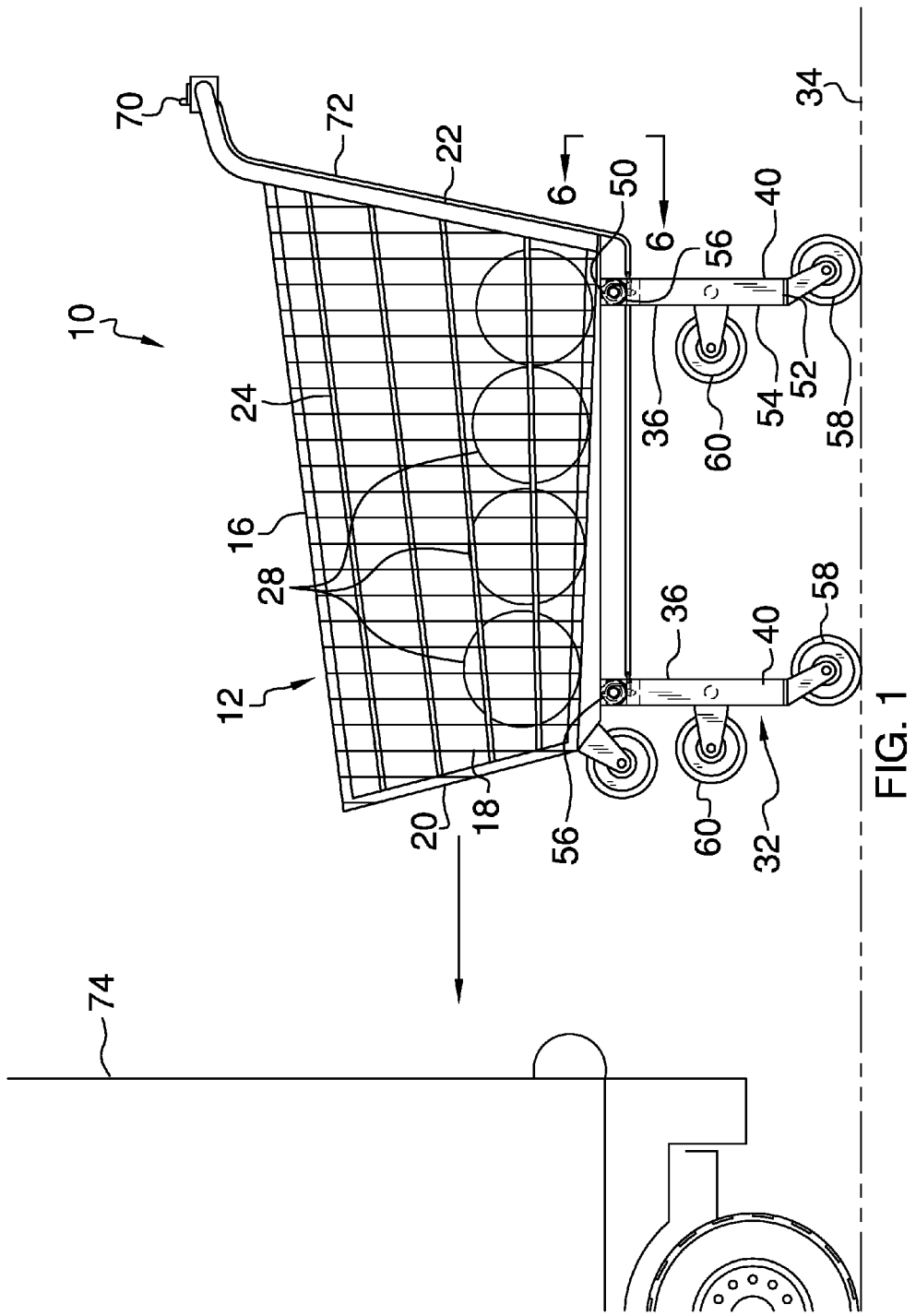
FIG. 1 is a left side view of a carriage assembly in a deployed position according to an embodiment of the disclosure.
Figure 2:
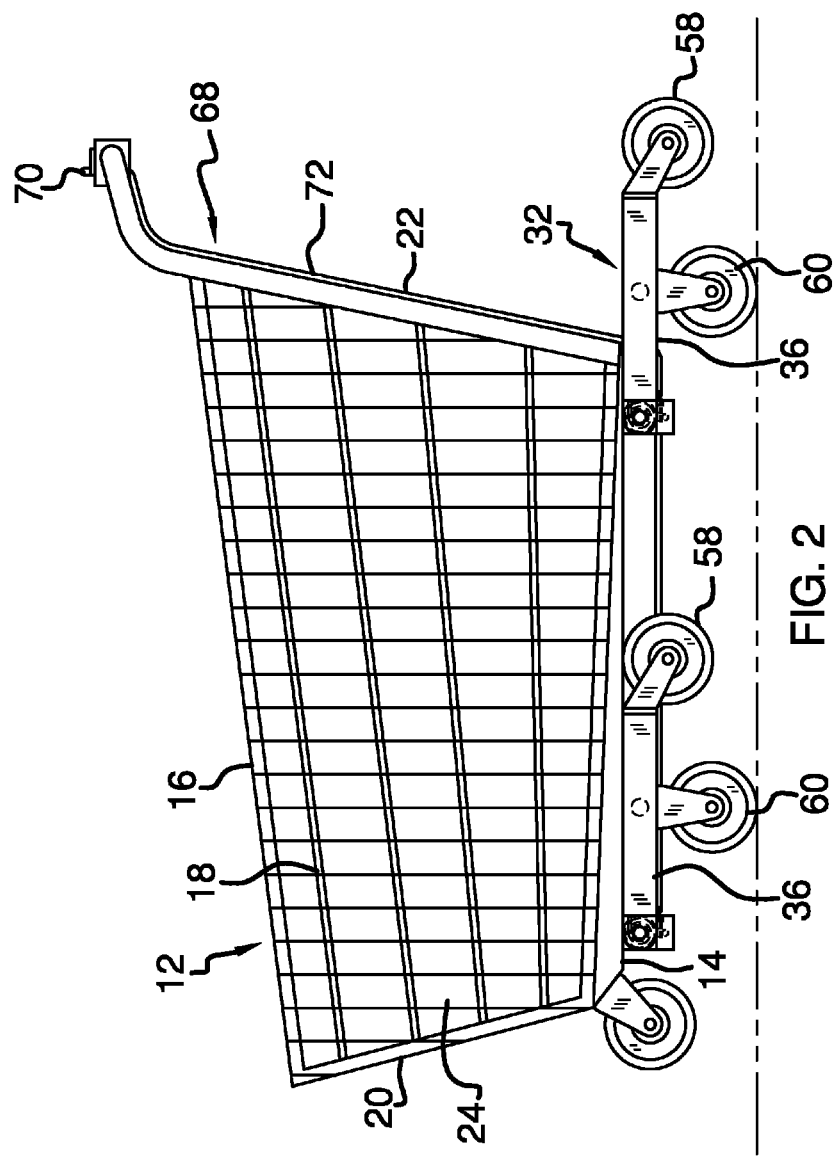
FIG. 2 is a left side view of an embodiment of the disclosure in a retracted position.
Figure 3:
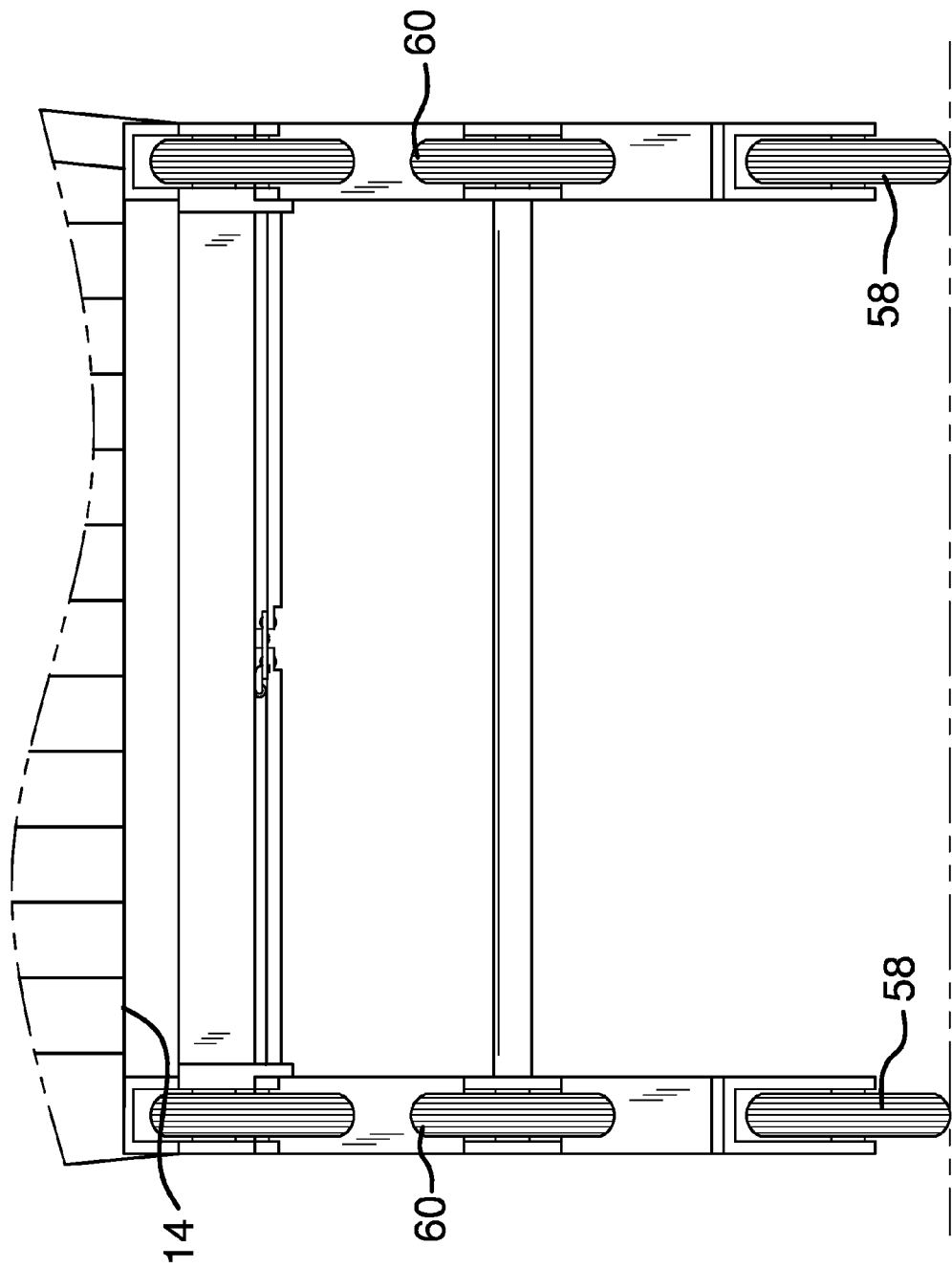
FIG. 3 is a front view of an embodiment of the disclosure.
Figure 4:
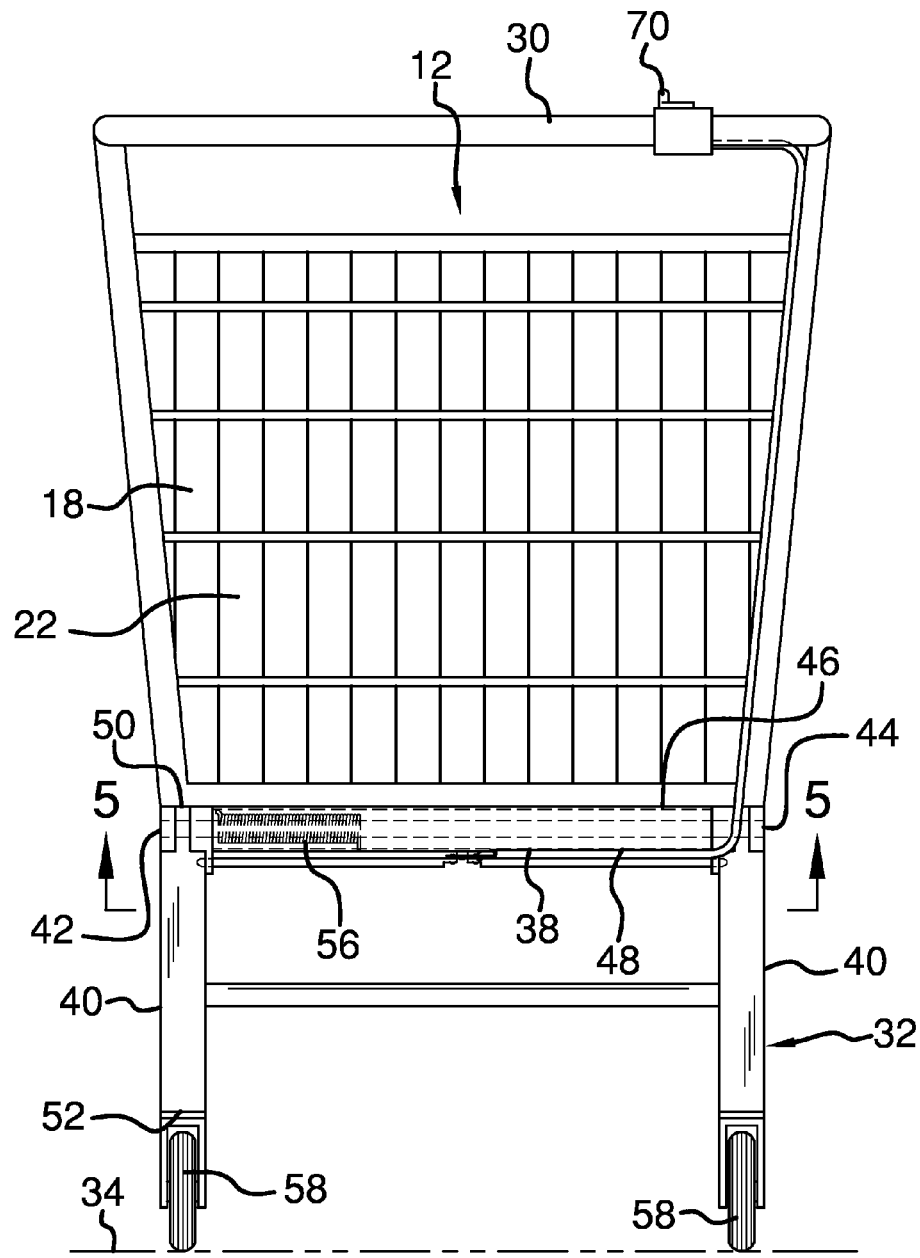
FIG. 4 is a back view of an embodiment of the disclosure.
Figure 5:
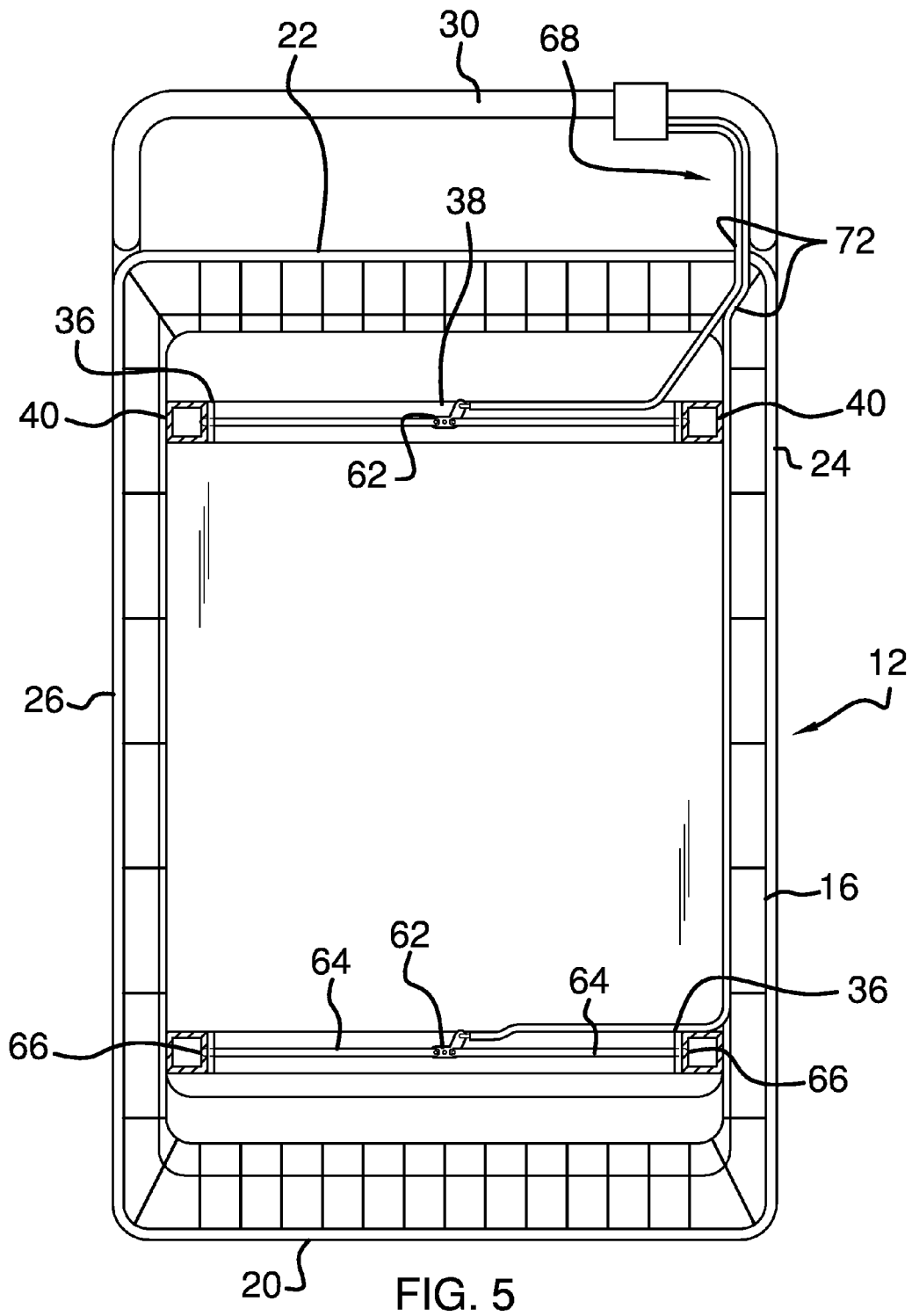
FIG. 5 is a top view of an embodiment of the disclosure.
Figure 6:
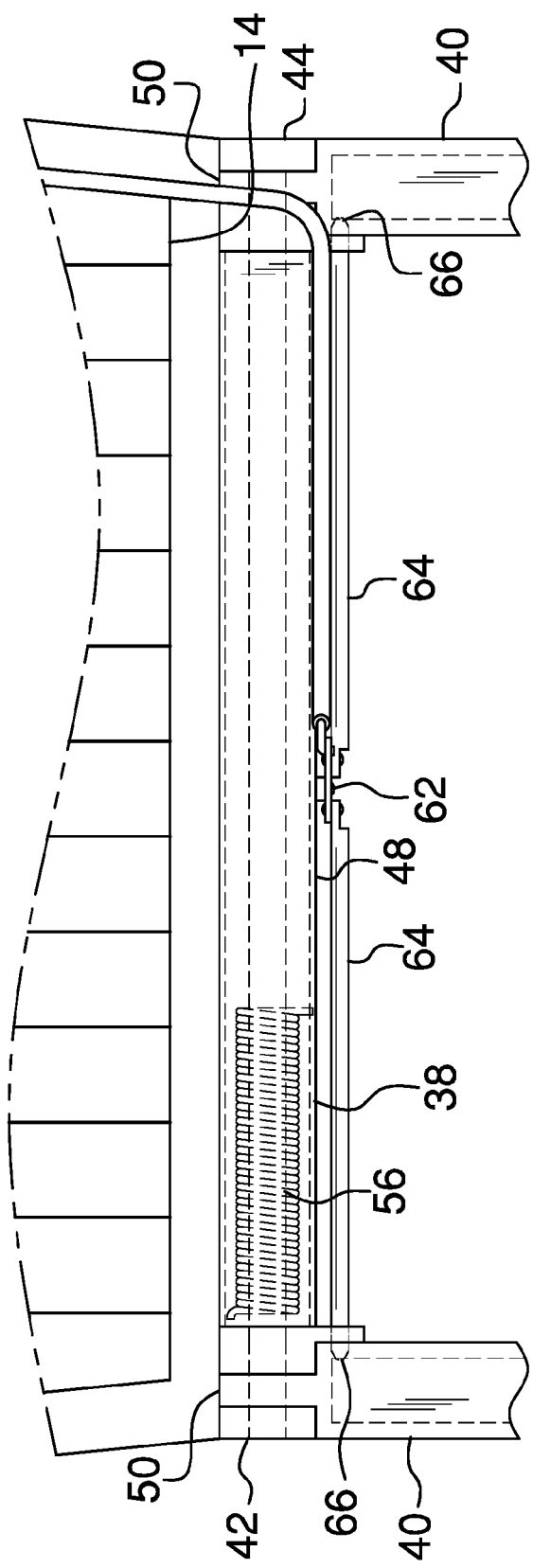
FIG. 6 is a cross sectional view taken along line 6-6 of FIG. 1 of an embodiment of the disclosure.

With reference now to the drawings, and in particular to FIGS. 1 through 6 thereof, a new cart device embodying the principles and concepts of an embodiment of the disclosure and generally designated by the reference numeral 10 will be described.

As best illustrated in FIGS. 1 through 6, the carriage assembly 10 generally comprises a cart 12 that has a bottom wall 14, an open top side 16 and a peripheral wall 18 extending upwardly from the bottom wall 14. The peripheral wall 18 has a front side 20, a back side 22, a first lateral side 24 and a second lateral side 26. The cart 12 may contain a plurality of objects 28. The objects 28 may be grocery bags or the like. A handle 30 is attached to the cart 12. Finally, the cart 12 may be a grocery cart or the like.

A rolling apparatus 32 is coupled to the cart 12 and abuts a support surface 34 to facilitate the cart 12 being rolled along the support surface 34. The rolling apparatus 32 is positionable in a deployed position to elevate the cart 12 a maximum distance above the support surface 34. The rolling apparatus 32 is positionable in a retracted position to lower the cart 12 to a minimum distance above the support surface 34. The maximum may be between 2 foot and 3 feet. The minimum distance may be between 6 inches and 1 foot.

The rolling apparatus 32 comprises a pair of supports 36 each coupled to the bottom wall 14. One of the supports 36 is positioned adjacent to the front side 20 and one of the supports 36 is positioned adjacent to the back side 22. The supports 36 each comprises a mount 38 and a pair of lateral legs 40 coupled thereto. The mount 38 has a first end 42, a second end 44, a top side 46 and a bottom side 48. The top side 46 of the mount 38 is coupled to the bottom wall 14 and the mount 38 extends between the first lateral side 24 and the second lateral side 26 of the peripheral wall 18.

Each of the lateral legs 40 has a top end 50, a bottom end 52 and a front side 54. The top ends 50 are each pivotally coupled to the mount 38. Each of the lateral legs 40 is positioned adjacent to one of the first end 42 and the second end 44. The lateral legs 40 extend downwardly from the bottom wall 14 when the rolling apparatus 32 is positioned in the deployed position. The lateral legs 40 may extend along the bottom wall when the rolling apparatus 32 is positioned in the retracted position.

A biasing member 56 is positioned within the mount 38. The biasing member 56 engages the top end 50 of each of the lateral legs 40. The biasing member 56 biases the lateral legs 40 into the deployed position. The biasing member 56 may be a coil spring or the like.

A pair of swiveled wheels 58 is each coupled to one of the bottom ends 52. The swiveled wheels 58 abut the support surface 34 when the lateral legs 40 are positioned in the deployed position. Each of the swiveled wheels 58 rotate about a rotational axis extending through the top 50 and bottom 52 ends of the lateral legs 40. A pair of fixed wheels 60 is each coupled to the front side 54 of one of the lateral legs 40. Each of the fixed wheels 60 are prevented from rotating about the rotational axis. The fixed wheels 60 are positioned between the top end 50 and the bottom end 52. The fixed wheels 60 abut the support surface 34 when the lateral legs 40 are positioned in the retracted position.

A cam 62 is rotatably coupled to the bottom side 48 of the mount 38. The cam 62 is centrally positioned on the bottom side 48. A pair of rods 64 is each coupled to the cam 62. Each of the rods 64 has a distal end 66 with respect to the cam 62 and is oriented such that the distal ends 66 engage the top end 50 of one of the lateral legs 40. The rods 64 releasably retain the lateral legs 40 in the deployed position and the retracted position.

A lock 68 is coupled to the cart 12 and is in mechanical communication with the rolling apparatus 32. The lock 68 releases the rolling apparatus 32 to facilitate positioning the rolling apparatus 32 between the deployed position and the retracted position. The lock 68 comprises a lever 70 movably coupled to the cart 12. The lever 70 is positioned on the handle 30 to be engaged by a user and release the rolling apparatus 32 between the deployed and retracted positions. A pair of cables 72 each extends between the lever 70 and the cam 62 on each of the supports 36. The cables 72 rotate the cams 72 when the lever 70 is engaged. The distal ends 66 of the rods 64 disengage from the lateral legs 40 to facilitate the lateral legs 40 being moved between the deployed position and the locked position.

In use, the cart 12 is filled with the objects 28. The lateral legs 40 are positioned in the retracted position to allow the cart 12 to be positioned within a vehicle 74 or the like. The lateral legs 40 are positioned in the deployed position while the cart 12 is removed from the vehicle 74. The objects 28 are placed within and removed from the vehicle 74 at once rather than individually.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A carriage assembly configured to have an adjustable height to facilitate said assembly being positioned within a vehicle, said assembly comprising:
   a cart having a bottom wall and a peripheral wall extending upwardly therefrom, a top side of said cart being open, said peripheral wall having a front side, a back side, a first lateral side and a second lateral side, said cart being configured to contain a plurality of objects;
   a handle being attached to said cart;
   a rolling apparatus coupled to said cart, said rolling apparatus abutting a support surface to facilitate said cart being rolled along the support surface, said rolling apparatus being positionable in a deployed position to elevate said cart a maximum distance above the support surface, said rolling apparatus being positionable in a retracted position to lower said cart to a minimum distance above the support surface; and
   a lock coupled to said cart, said lock being in mechanical communication with said rolling apparatus, said lock releasing said rolling apparatus to facilitate positioning said rolling apparatus between said deployed position and said retracted position;
   wherein said rolling apparatus comprises a pair of supports, each of said supports being coupled to said bottom wall, each of said supports being positioned adjacent to one of said front side and said back side;
   wherein each of said supports comprises a mount and a pair of lateral legs coupled thereto, said mount each having a first end, a second end, a top side and a bottom side, each of said lateral legs having a top end, a bottom end and a front side, said top ends each being pivotally coupled to said mount, each of said lateral legs being positioned adjacent to one of said first end and said second end;
   wherein said top side of each said mount is coupled to said bottom wall, each said mount extending between said first lateral side and said second lateral side of said peripheral wall, said lateral legs extending downwardly from said bottom wall when said rolling apparatus is positioned in said deployed position, said lateral legs extending along said bottom wall when said rolling apparatus is positioned in said retracted position; and
   a biasing member positioned within said mount, said biasing member engaging said top end of each of said lateral legs, said biasing member biasing said lateral legs into said deployed position.

2. The assembly according to claim 1, further comprising a pair of swiveled wheels, each swiveled wheel being coupled to a respective one of said bottom ends, said swiveled wheels being configured to abut the support surface when said lateral legs are positioned in said deployed position, a pair of fixed wheels each being coupled to said front side of one of said lateral legs, said fixed wheels being positioned between said top end and said bottom end, said fixed wheels being configured to abut the support surface when said lateral legs are positioned in said retracted position.

3. The assembly according to claim 1, wherein said lock comprising a lever movably coupled to said cart, said lever being positioned on said handle, said lever being configured to be actuated by a user to release said rolling apparatus between said deployed and retracted positions.

4. The assembly according to claim 1, wherein:
   said rolling apparatus comprising a pair of supports, each of said supports including a pair of lateral legs;
   a pair of rods each having a distal end;
   a cam rotatably coupled to each of said supports; and
   a pair of cables, said cables each extending between said lever and said cam on each of said supports, said cables rotating said cam when said lever is engaged, said distal ends of said rods disengaging from said lateral legs to facilitate said lateral legs being moved between said deployed position and said locked position.

5. A carriage assembly configured to have an adjustable height to facilitate said assembly being positioned within a vehicle, said assembly comprising:
   a cart having a bottom wall and a peripheral wall extending upwardly therefrom, a top side of said cart being open, said peripheral wall having a front side, a back side, a first lateral side and a second lateral side, said cart being configured to contain a plurality of objects;
   a handle being attached to said cart;
   a rolling apparatus coupled to said cart, said rolling apparatus abutting a support surface to facilitate said cart being rolled along the support surface, said rolling apparatus being positionable in a deployed position to elevate said cart a maximum distance above the support surface, said rolling apparatus being positionable in a retracted position to lower said cart to a minimum distance above the support surface, said rolling apparatus comprising:
       a pair of supports, each of said supports being coupled to said bottom wall, each of said supports being positioned adjacent to one of said front side and said back side, each of said supports comprising:
           a mount and a pair of lateral legs coupled thereto, said mount each having a first end, a second end, a top side and a bottom side, each of said lateral legs having a top end, a bottom end and a front side, said top ends each being pivotally coupled to said mount, each of said lateral legs being positioned adjacent to one of said first end and said second end, said top side of said mount being coupled to said bottom wall, said mount extending between said first lateral side and said second lateral side of said peripheral wall, said lateral legs extending downwardly from said bottom wall when said rolling apparatus is positioned in said deployed position, said lateral legs extending along said bottom wall when said rolling apparatus is positioned in said retracted position;

a biasing member positioned within said mount, said biasing member engaging said top end of each of said lateral legs, said biasing member biasing said lateral legs into said deployed position;

a pair of swiveled wheels, each swiveled wheel being coupled to a respective one of said bottom ends, said swiveled wheels being configured to abut the support surface when said lateral legs are positioned in said deployed position;

a pair of fixed wheels each being coupled to said front side of one of said lateral legs, said fixed wheels being positioned between said top end and said bottom end, said fixed wheels being configured to abut the support surface when said lateral legs are positioned in said retracted position;

a cam rotatably coupled to said bottom side of said mount, said cam being centrally positioned on said bottom side; and a pair of rods, each of said rods being coupled to said cam, each of said rods having a distal end with respect to said cam, said rods being oriented such that said distal ends engage said top end of one of said lateral legs, said rods retaining said lateral legs in said deployed position and said retracted position;

a lock coupled to said cart, said lock being in mechanical communication with said rolling apparatus, said lock releasing said rolling apparatus to facilitate positioning said rolling apparatus between said deployed position and said retracted position, said lock comprising:

a lever movably coupled to said cart, said lever being positioned on said handle, said lever being configured to be engaged by a user to release said rolling apparatus between said deployed and retracted positions; and a pair of cables, said cables each extending between said lever and said cam on each of said supports, said cables rotating said cams when said lever is engaged, said distal ends of said rods disengaging from said lateral legs to facilitate said lateral legs being moved between said deployed position and said locked position.

6. A carriage assembly configured to have an adjustable height to facilitate said assembly being positioned within a vehicle, said assembly comprising:

a cart having a bottom wall and a peripheral wall extending upwardly therefrom, a top side of said cart being open, said peripheral wall having a front side, a back side, a first lateral side and a second lateral side, said cart being configured to contain a plurality of objects;

a handle being attached to said cart;

a rolling apparatus coupled to said cart, said rolling apparatus abutting a support surface to facilitate said cart being rolled along the support surface, said rolling apparatus being positionable in a deployed position to elevate said cart a maximum distance above the support surface, said rolling apparatus being positionable in a retracted position to lower said cart to a minimum distance above the support surface;

a lock coupled to said cart, said lock being in mechanical communication with said rolling apparatus, said lock releasing said rolling apparatus to facilitate positioning said rolling apparatus between said deployed position and said retracted position;

wherein said rolling apparatus comprises a pair of supports, each of said supports being coupled to said bottom wall, each of said supports being positioned adjacent to one of said front side and said back side; and a cam rotatably coupled to said bottom side of said mount, said cam being centrally positioned on said bottom side.

7. The assembly according to claim 6, further comprising a pair of rods, each of said rods being coupled to said cam, each of said rods having a distal end with respect to said cam, said rods being oriented such that said distal ends engage said top end of one of said lateral legs, said rods retaining said lateral legs in said deployed position and said retracted position.

* * * * *